United States Patent
Anker et al.

(10) Patent No.: US 9,873,436 B2
(45) Date of Patent: Jan. 23, 2018

(54) VEHICLE CONTROL SYSTEM AND METHOD FOR CONTROLLING A VEHICLE

(75) Inventors: Sam Anker, Coventry (GB); Dan Dennehy, Coventry (GB); Elliot Hemes, Solihull (GB); James Kelly, Solihull (GB); Andrew Fairgrieve, Rugby (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/130,655

(22) PCT Filed: Jul. 4, 2012

(86) PCT No.: PCT/EP2012/063065
§ 371 (c)(1),
(2), (4) Date: Mar. 11, 2014

(87) PCT Pub. No.: WO2013/004764
PCT Pub. Date: Jan. 10, 2013

(65) Prior Publication Data
US 2014/0350789 A1    Nov. 27, 2014

(30) Foreign Application Priority Data
Jul. 4, 2011  (GB) .................................. 1111288.5

(51) Int. Cl.
*B60W 40/00* (2006.01)
*B60W 10/00* (2006.01)
(Continued)

(52) U.S. Cl.
CPC ............. *B60W 40/00* (2013.01); *B60G 99/00* (2013.01); *B60W 50/00* (2013.01);
(Continued)

(58) Field of Classification Search
None
See application file for complete search history.

(56) References Cited

U.S. PATENT DOCUMENTS

| 5,808,219 A | 9/1998 | Usa |
| 7,349,776 B2 | 3/2008 | Spillane et al. |

(Continued)

FOREIGN PATENT DOCUMENTS

| CN | 101553377 A | 10/2009 |
| EP | 1355209 A1 | 10/2003 |

(Continued)

OTHER PUBLICATIONS

International Search Report for PCT/EP2012/063065 dated Oct. 9, 2012, 5 pages.

(Continued)

*Primary Examiner* — Rami Khatib
(74) *Attorney, Agent, or Firm* — Reising Ethington P.C.

(57) ABSTRACT

A vehicle control system for at least one vehicle subsystem of a vehicle; the vehicle control system comprising a subsystem controller for initiating control of the or each of the vehicle subsystems in a selected one of a plurality of different subsystem control modes, each of which corresponds to one or more different driving conditions for the vehicle. Evaluation means are provided for evaluating one or more driving condition indicators to determine the extent to which each of the subsystem control modes is appropriate and for providing an output to the subsystem controller that is indicative of the control mode which is most appropriate. This may be an evaluation means for calculating the probability that the or each of the subsystem control modes is appropriate. Automatic control means may be operable in an automatic response mode to select an appropriate one of the subsystem control modes in dependence on the output.

17 Claims, 3 Drawing Sheets

(51) Int. Cl.
  *B60W 30/00* (2006.01)
  *B60W 40/02* (2006.01)
  *B60W 40/10* (2012.01)
  *B60W 40/12* (2012.01)
  *B60W 50/00* (2006.01)
  *B60W 50/08* (2012.01)
  *B60G 99/00* (2010.01)
  *B62D 15/02* (2006.01)
  *B60W 10/06* (2006.01)
  *B60W 10/184* (2012.01)
  *B60W 10/20* (2006.01)
  *B60W 10/22* (2006.01)
  *B60W 30/182* (2012.01)

(52) U.S. Cl.
  CPC ........ *B60W 50/082* (2013.01); *B60W 50/087* (2013.01); *B62D 15/025* (2013.01); *B60W 10/06* (2013.01); *B60W 10/184* (2013.01); *B60W 10/20* (2013.01); *B60W 10/22* (2013.01); *B60W 30/182* (2013.01); *B60W 50/0097* (2013.01); *B60W 2050/0071* (2013.01); *B60W 2050/0095* (2013.01); *B60W 2540/10* (2013.01); *B60W 2540/12* (2013.01); *B60W 2540/30* (2013.01); *B60W 2550/14* (2013.01); *B60W 2550/141* (2013.01); *B60W 2550/147* (2013.01); *B60W 2550/148* (2013.01)

(56) References Cited

U.S. PATENT DOCUMENTS

| | | | |
|---|---|---|---|
| 2005/0004732 A1* | 1/2005 | Berry | B60W 10/06 701/48 |
| 2006/0220910 A1 | 10/2006 | Becker et al. | |
| 2007/0016351 A1 | 1/2007 | Allen et al. | |
| 2009/0164071 A1 | 6/2009 | Takeda | |
| 2010/0049408 A1* | 2/2010 | Abadie | B60T 8/1706 701/48 |
| 2010/0250049 A1* | 9/2010 | Nihei | B60K 23/0808 701/31.4 |
| 2010/0315218 A1* | 12/2010 | Cades | B60K 35/00 340/441 |

FOREIGN PATENT DOCUMENTS

| | | |
|---|---|---|
| EP | 2075171 A1 | 7/2009 |
| GB | 2403027 A | 12/2004 |
| JP | H07156815 A | 6/1995 |
| JP | H0939760 A | 2/1997 |
| JP | H09185716 A | 7/1997 |
| JP | H09290655 A | 11/1997 |
| JP | H1199848 A | 4/1999 |
| JP | 2006522973 A | 10/2006 |
| JP | 2009067375 A | 4/2009 |
| JP | 2009149243 A | 7/2009 |
| JP | 2010510928 A | 4/2010 |
| WO | WO 2007/107360 A1 | 9/2007 |
| WO | WO 2009/066143 A1 | 5/2009 |

OTHER PUBLICATIONS

UK Search Report for corresponding application No. GB 1111288.5, dated Nov. 7, 2011, 5 pages.
UK Search Report for application No. GB 1211910.3, dated Oct. 26, 2012, 6 pages.
Japanese Office Action in Japanese with English abstract corresponding with JP application No. 2015-215981, dated Jul. 12, 2016, 7 pages.
English Summary of Japanese Office action corresponding to Application No. 2014-517793, dated Jun. 30, 2015, 2 pages.
Chinese Office action and Search Report corresponding to Application No. 201280033279.2, dated Aug. 11, 2015, 9 pages.

* cited by examiner

VEHICLE CONTROL SYSTEM AND METHOD FOR CONTROLLING A VEHICLE

FIELD OF INVENTION

The present invention relates to a vehicle control system for one or more vehicle subsystems. The vehicle control system evaluates operating parameters of the vehicle and enables the implementation of an operating mode for the or each vehicle subsystem that is suitable for the driving conditions in which the vehicle is travelling. The invention also relates to a method of controlling one or more vehicle subsystems.

BACKGROUND TO THE INVENTION

It is known in vehicles to provide various different subsystems which can operate in different configurations so as to suit different driving conditions. By way of example, automatic transmissions can be controlled in a variety of modes (e.g. sport, manual, winter or economy) in which changes between gear ratios and other subsystem control parameters are modified so as to suit the conditions of the terrain or the particular taste of the driver. It is also known to provide air suspensions with on-road and off-road modes. Stability control systems can be operated at reduced activity so as to give the driver more direct control, and power steering systems can be operated in different modes to provide a varying level of assistance depending on driving conditions.

The Applicant has recognised previously that the high level of choice for drivers poses a complicated and confusing scenario for an effective, safe and enjoyable driving experience. Our granted U.S. Pat. No. 7,349,776 describes a vehicle control system in which the driver can implement improved control over a broad range of driving conditions, and in particular over a number of different terrains which may be encountered when driving off-road. In response to a driver input command relating to the terrain, the vehicle control system is selected to operate in one of a number of different driving modes. For each driving mode, the various vehicle subsystems are operated in a manner appropriate to the corresponding terrain.

It has now been recognised that further improvements to the vehicle control system would provide a more effective and enjoyable driving experience for a range of driving styles and driver abilities. It is therefore an object of the present invention to provide a vehicle control system which provides an improvement to systems generally of the aforementioned type.

SUMMARY OF THE INVENTION

According to a first aspect of the present invention, there is provided a vehicle control system for at least one vehicle subsystem of a vehicle comprising a subsystem controller for initiating control of the or each of the vehicle subsystems in a selected one of a plurality of subsystem control modes, each of which corresponds to one or more different driving conditions for the vehicle. The vehicle control system further includes evaluation means for evaluating one or more driving condition indicators to determine the extent to which each of the subsystem control modes is appropriate and for providing an output indicative of the subsystem control mode which is most appropriate.

Preferably, the output is provided to the subsystem controller and, in a preferred embodiment, the vehicle control system further includes automatic control means operable in an automatic response mode to select the most appropriate one of the subsystem control modes in dependence on the output.

It is preferable for the evaluation means to determine the probability that each of the subsystem control modes is appropriate and to provide an output which is indicative of the subsystem control mode with the highest probability of being appropriate.

The evaluation means may preferably take the form of a software-implemented evaluation means in the form of a processor located within a vehicle control unit of the vehicle control system.

The subsystem controller may be a central controller which as well as initiating control of the most appropriate of the plurality of control modes by selecting the most appropriate one, is also arranged to control the or each of the vehicle subsystems in said selected control mode. Alternatively the subsystem controller may initiate control of the vehicle subsystems in the selected one of the control modes via an intermediate controller which then controls the vehicle subsystems in the selected control mode. A different intermediate controller may be associated with each vehicle subsystem. The or each intermediate controller may form an integral part of the subsystem controller.

It may be that only one of a plurality of vehicle subsystems is controlled by the subsystem controller (or the intermediate controller) in the most appropriate control mode, depending on driving conditions.

It is preferable, although not essential, for a plurality (i.e. two or more) of driving condition indicators to be provided to the evaluation means.

It will be appreciated that there may be only two subsystem control modes (e.g. one that is appropriate for on-road and one that is appropriate for off-road).

In one embodiment, the or each of the driving condition indicators is derived from a signal indicative of the terrain in which the vehicle is travelling. Each of the different driving conditions with which the different subsystem control modes is associated may therefore be representative of or appropriate for at least one terrain type. For example, grass, gravel and snow may be associated with one of the subsystem control modes and mud and ruts may be associated with another of the subsystem control modes.

Rather than relying on the driver to identify the most appropriate control mode for the vehicle subsystem or subsystems, the present invention utilises an evaluation means for evaluating operating signals of the vehicle, such as those that are indicative of the terrain in which the vehicle is travelling, and in a preferred embodiment enables the automatic implementation of a vehicle subsystem control mode which is appropriate for the terrain condition or driving style of the driver without requiring the driver to identify or select the most appropriate mode of control. As there is no reliance on driver input in order for the appropriate control mode to be selected, this allows for a more composed and enjoyable driving experience, and with reduced workload on the engine.

Alternatively, or in addition, the or each of the driving condition indicators may be derived from a signal indicative of the character of the driving style of the driver of the vehicle. Therefore, each of the plurality of different driving conditions with which the different subsystem control modes is associated may be representative or associated with a characteristic of driving style. The characteristics of driving style may range from an economy-oriented driving style to a performance-oriented driving style, including, for example, a dynamic style, a sporty style and an economical style.

By way of example, the evaluation means may receive one or more of the following indicators to identify the current driving style of the driver:
(a) a speed of rotation of the engine;
(b) a speed of rotation of the electric motor means;
(c) a speed of the vehicle;
(d) a longitudinal acceleration of the vehicle;
(e) a lateral acceleration of the vehicle;
(f) an accelerator pedal position;
(g) a state of an accelerator pedal kick-down detector;
(h) a brake pedal position;
(i) a proportion of an amount of a brake torque requested by the driver that is provided by regenerative braking;
(j) a speed of at least one portion of a driveline of the vehicle;
(k) an amount of positive drive torque;
(l) a rate of change of positive drive torque request;
(m) a steering wheel angle; and
(n) a rate of change of steering wheel angle.

In a preferred embodiment, the evaluation means includes estimator means for receiving one or more input signals corresponding to a respective one of the driving condition indicators and for estimating one or more further driving condition indicators on the basis of the input signals.

The evaluation means may further include means for calculating a combined probability value for each subsystem control mode based on individual probability values for each subsystem control mode derived from the or each of the driving condition indicators, wherein the control output signal from the evaluation means is indicative of the control mode with the highest combined probability value.

The combined probability value (Pb) for each control mode may, in one embodiment, be calculated by the following equation:

$$Pb = (a \cdot b \cdot c \cdot d \ldots n) / ((a \cdot b \cdot c \cdot d \ldots n) + (1-a) \cdot (1-b) \cdot (1-c) \cdot (1-d) \ldots (1-n))$$

wherein a, b, c, d . . . n represent the individual probability values derived from a respective one of the driving condition indicators (the individual probability value is an indication of the probability that the control mode is appropriate, based on one of the driving condition indicators).

Certain terrain indicators may make a control mode more or less likely when combined together, compared with basing the selection on just a single terrain indicator alone. It is therefore advantageous if the automatic response is based on a combined probability value dependent on a plurality of different driving condition indicators, rather than relying on a probability value for just one driving condition indicator.

The vehicle control system may further comprise means for calculating, for each of the control modes, a difference value between the probability for the current control mode and the probability for another control mode.

In addition, means may be provided for integrating each of the difference values with respect to time to calculate an integrated difference value for each of the other control modes.

In a preferred embodiment a comparison means is provided for comparing each of the integrated difference values with a threshold for change.

A further means may be provided for initiating a change in the selected subsystem control mode when the integrated difference value for one of the control modes exceeds the threshold for change.

It is preferable for the comparison means to compare each of the integrated difference values with a plurality of thresholds for change, rather than just a single threshold. The means for initiating a change in the selected subsystem is then operable to initiate a change when a first one of the thresholds for change is reached.

For example, each threshold for change may be variable in dependence on a different driving condition indicator such as the surface roughness of the terrain in which the vehicle is travelling or the rolling resistance of the terrain in which the vehicle is travelling.

It is an advantage of providing a variable threshold for change, dependent on different terrain indicators, that the speed of response with which the control mode is selected can be varied according to the nature of the terrain in which the vehicle is travelling. This ensures that less control mode changes will be implemented in certain conditions (e.g. on-road terrain) compared to others (e.g. off-road terrain).

The or each of the driving condition indicators is preferably derived from a sensor output signal from a sensor provided on the vehicle. The sensor output signals may include a signal from a windscreen wiper sensor to provide an indication of the ON/OFF status of a vehicle windscreen wiper and/or to provide an indication of the duration for which a vehicle windscreen wiper has been in an ON state.

It has not previously been suggested to use a signal derived from the windscreen wiper sensors as an indication of the driving condition for the purpose of vehicle control. This feature of the invention has the advantage that the windscreen wiper sensors are in place anyway on the vehicle, and so no additional hardware is required for implementation.

The sensor output signals may also, or alternatively, include a signal from a steering system of the vehicle for controlling the steering direction of vehicle, which is indicative of the force applied to the steering system.

The sensor output signals may also, or alternatively, include a signal from one or more of the brake pedal and the accelerator pedal of the vehicle. For example, the vehicle control system may be provided with means for comparing when sensor signals from the brake pedal and the accelerator pedal coincide and for providing a further driving condition indicator to the evaluation means on the basis of the comparison. In this way the dual-use of both the brake and accelerator pedals, which is indicative of the terrain in which the vehicle is driving, can be used to influence the automatic selection of the appropriate control mode for the vehicle subsystems.

The vehicle control system may further include switching means for enabling the driver to switch between the automatic response mode in which the automatic control means controls the vehicle subsystem or subsystems in dependence on the output automatically, and a manual response mode in which the subsystem control mode is selected by the driver manually. In addition, or alternatively, the vehicle control system may further include means for automatically switching to the automatic response mode from the manual mode e.g. in dependence on one or more of the driving condition indicators.

The at least one vehicle subsystem may include, but is not limited to including, one or more of: an engine management system, a steering controller, a brakes controller, a suspension controller, a gearbox controller, a tyre pressure controller.

According to a second aspect of the invention, there is provided a method of controlling at least one vehicle subsystem of a vehicle comprising initiating control of the or each of the vehicle subsystems in a selected one of a plurality of different subsystem control modes, each of which corresponds to one or more different driving conditions for the vehicle, evaluating one or more driving condition indicators to determine the extent to which each of the subsystem control modes is appropriate and providing an output indicative of the control mode which is most appropriate. Preferably, the method includes automatically selecting an appropriate one of the subsystem control modes in dependence on the output.

In a preferred embodiment, the evaluating step includes evaluating one or more driving condition indicators to determine the probability that each of the subsystem control modes is appropriate, the method further comprising providing an output indicative of the control mode with the highest probability.

According to a third aspect of the invention, there is provided a vehicle having a vehicle control system of the first aspect of the invention.

According to a further aspect of the present invention, there is provided a vehicle control system for at least one vehicle subsystem of a vehicle comprising a subsystem controller for controlling the or each of the vehicle subsystems in a plurality of subsystem control mode, each of which corresponds to one or more different driving conditions for the vehicle. The vehicle control system further includes evaluation means for evaluating one or more driving condition indicators to determine the probability that each of the subsystem control modes is appropriate and for providing an output indicative of the control mode with the highest probability of being appropriate; and automatic control means operable in an automatic response mode to select an appropriate one of the subsystem control modes in dependence on the output.

It will be appreciated that preferred and/or optional features of the first aspect of the invention may be included within the second, third or further aspects of the invention, alone or in appropriate combination.

BRIEF DESCRIPTION OF THE DRAWINGS

In order that the invention may be more readily understood, reference will now be made, by way of example only, to the following Figures in which.

DETAILED DESCRIPTION OF THE INVENTION

Figure 1:
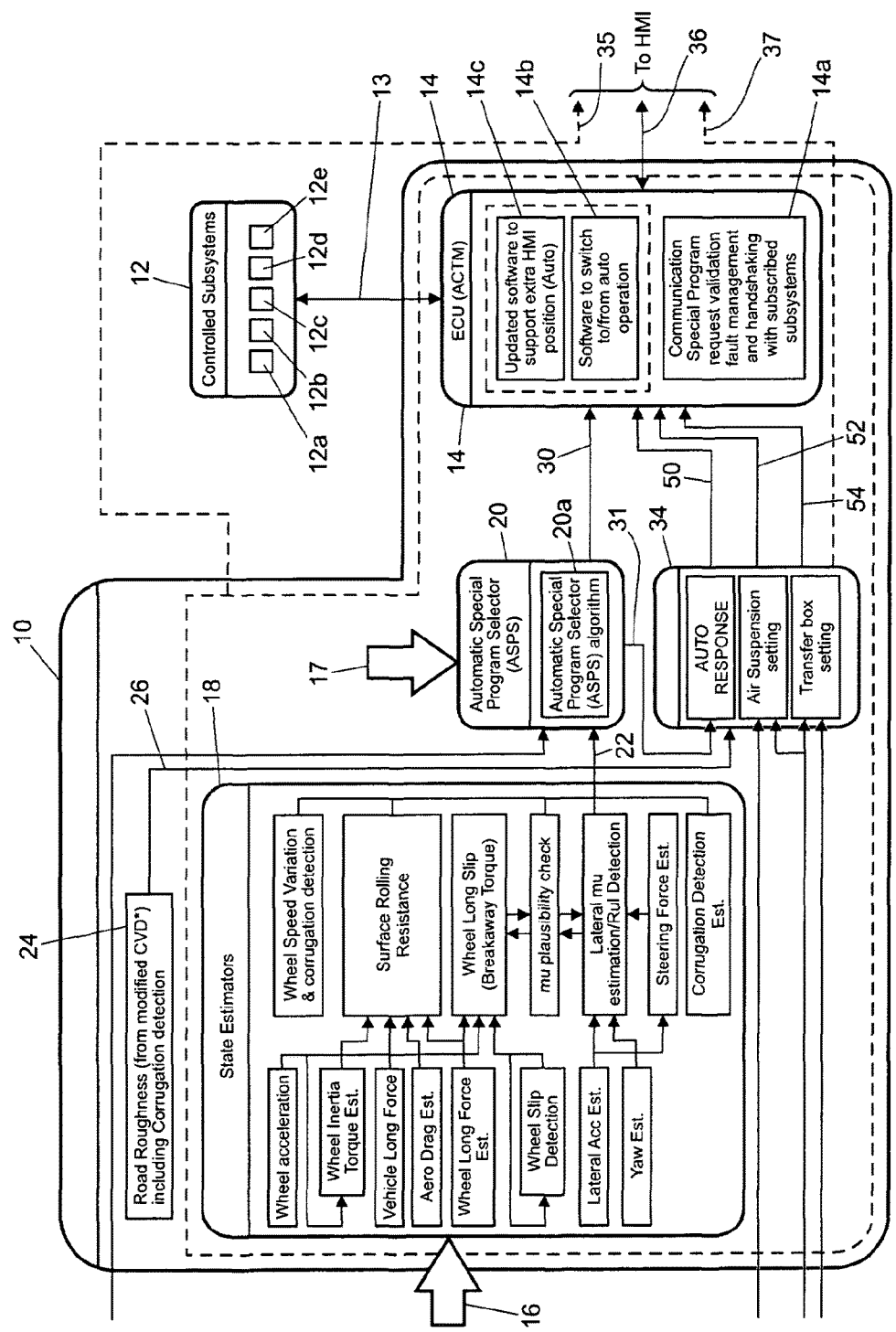
FIG. 1 is a block diagram to illustrate a vehicle control system in accordance with an embodiment of the invention, including various vehicle subsystems under the control of the vehicle control system.
Figure 2:
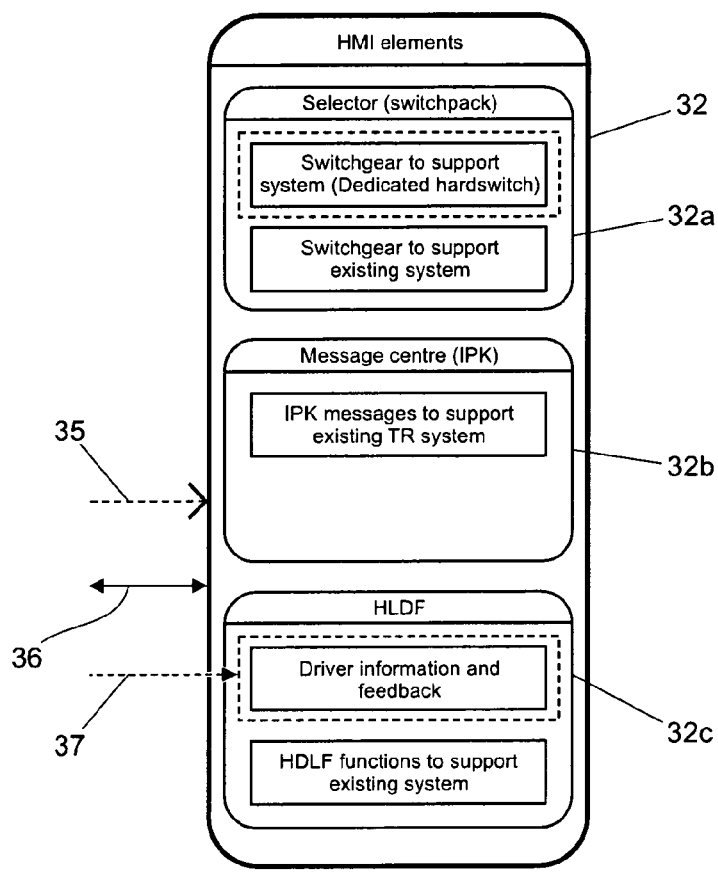
FIG. 2 is a block diagram of human machine interface (HMI) elements forming part of the vehicle control system in FIG. 1 in more detail.

FIGS. 1 and 2 show a vehicle control unit (VCU) 10 for a vehicle intended to be suitable for off-road use, that is for use on terrains other than regular tarmac road surfaces. The VCU 10 controls a plurality of vehicle subsystems 12 including, but not limited to, an engine management system 12a, a transmission system 12b, a steering system 12c, a brakes system 12d and a suspension system 12e. Although five subsystems are illustrated as being under the control of the VCU 10, in practice a greater number of vehicle subsystems may be included on the vehicle and may be under the control of the VCU 10. The VCU 10 includes a subsystem control module 14 which provides control signals via line 13 to each of the vehicle subsystems to initiate control of the subsystems in a manner appropriate to the driving condition, such as the terrain, in which the vehicle is travelling (referred to as the terrain condition). The subsystems 12 also communicate with the subsystems control module 14 via signal line 13 to feedback information on subsystem status.

The VCU 10 receives a plurality of signals, represented generally at 16 and 17, which are received from a plurality of vehicle sensors and are representative of a variety of different parameters associated with vehicle motion and status. As described in further detail below, the signals 16, 17 provide, or are used to calculate, a plurality of driving condition indicators (also referred to as terrain indicators) which are indicative of the nature of the condition in which the vehicle is travelling. One advantageous feature of the invention is that the VCU 10 determines the most appropriate control mode for the various subsystems on the basis of the terrain indicators, and automatically controls the subsystems accordingly.

The sensors (not shown) on the vehicle include, but are not limited to, sensors which provide continuous sensor outputs 16 to the VCU 10, including wheel speed sensors, an ambient temperature sensor, an atmospheric pressure sensor, tyre pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor on the stability control system (SCS), a brake pedal position sensor, an acceleration pedal position sensor and longitudinal, lateral, vertical motion sensors.

In other embodiments, only a selection of the aforementioned sensors may be used. The VCU 10 also receives a signal from the electronic power assisted steering unit (ePAS unit) of the vehicle to indicate the steering force that is applied to the wheels (steering force applied by the driver combined with steering force applied by the ePAS system).

The vehicle is also provided with a plurality of sensors which provide discrete sensor outputs 17 to the VCU 10, including a cruise control status signal (ON/OFF), a transfer box status signal (whether the gear ratio is set to a HI range or a LO range), a Hill Descent Control (HDC) status signal (ON/OFF), a trailer connect status signal (ON/OFF), a signal to indicate that the Stability Control System (SCS) has been activated (ON/OFF), a windscreen wiper signal (ON/OFF), air suspension status (HI/LO), and a Dynamic Stability Control (DSC) signal (ON/OFF).

The VCU 10 includes an evaluation means in the form of an estimator module or processor 18 and a calculation and selection means in the form of a selector module or processor 20. Initially the continuous outputs 16 from the sensors are provided to the estimator module 18 whereas the discrete signals 17 are provided to the selector module 20.

Within a first stage of the estimator module 18, various ones of the sensor outputs 16 are used to derive a number of terrain indicators. In a first stage of the estimator module 18, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived from the motion sensors to detect yaw, pitch and roll. Other calculations performed within the first stage of the estimator module 18 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw, and lateral vehicle acceleration.

The estimator module 18 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from the steering wheel sensor), the wheel longitudinal slip (based on the longitudinal force on the wheels, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface).

The SCS activity signal is derived from several outputs from a Stability Control Systems (SCS) ECU (not shown), which contains the DSC (Dynamic Stability Control) function, the TC (Traction Control) function, ABS and HDC algorithms, indicating DSC activity, TC activity, ABS activity, brake interventions on individual wheels, and engine torque reduction requests from the SCS ECU to the engine. All these indicate a slip event has occurred and the SCS ECU has taken action to control it. The estimator module 18 also uses the outputs from the wheel speed sensors to determine a wheel speed variation and corrugation detection signal.

On the basis of the windscreen wiper signal (ON/OFF), the estimator module 18 also calculates how long the windscreen wipers have been in an ON state (i.e. a rain duration signal).

The VCU 10 also includes a road roughness module 24 for calculating the terrain roughness based on the air suspension sensors (the ride height sensors) and the wheel accelerometers. A terrain indicator signal in the form of a roughness output signal 26 is output from the road roughness module 24.

The estimates for the wheel longitudinal slip and the lateral friction estimation are compared with one another within the estimator module 18 as a plausibility check.

Calculations for wheel speed variation and corrugation output, the surface rolling resistance estimation, the wheel longitudinal slip and the corrugation detection, together with the friction plausibility check, are output from the estimator module 18 and provide terrain indicator output signals 22, indicative of the nature of the terrain in which the vehicle is travelling, for further processing within the VCU 10.

The terrain indicator signals 22 from the estimator module 18 are provided to the selector module 20 for determining which of a plurality of vehicle subsystem control modes is most appropriate based on the indicators of the type of terrain in which the vehicle is travelling. The most appropriate control mode is determined by analysing the probability that each of the different control modes is appropriate on the basis of the terrain indicator signals 22, 26 from the estimator module 18 and the road roughness module 24.

The vehicle subsystems 12 may be controlled automatically (referred to as the "automatic mode") in response to a control output signal 30 from the selector module 20 and without the need for driver input. Alternatively, the vehicle subsystems 12 may be operated in response to a manual driver input (referred to as "manual mode") via a Human Machine Interface (HMI) module (not shown in FIG. 1). The subsystem controller 14 may itself control the vehicle subsystems 12a-12e directly via the signal line 13, or alternatively each subsystem may be provided with its own associated intermediate controller (not shown in FIG. 1) for providing control of the relevant subsystem 12a-12e. In the latter case the subsystem controller 14 may only control the selection of the most appropriate subsystem control mode for the subsystems 12a-12e, rather than implementing the actual control steps for the subsystems. The or each intermediate controller may in practice form an integral part of the main subsystem controller 14.

When operating in the automatic mode, the selection of the most appropriate subsystem control mode is achieved by means of a three phase process:

(1) for each type of control mode, a calculation is performed of the probability that the control mode is suitable for the terrain over which the vehicle is travelling, based on the terrain indicators;

(2) the integration of "positive differences" between the probability for the current control mode and the other control modes; and (3) the program request to the control module 14 when the integration value exceeds a predetermined threshold or the current terrain control mode probability is zero.

The specific steps for phases (1), (2) and (3) will now be described in more detail.

In phase (1), the continuous terrain indicator signals in the form of the road surface roughness output 26 and the outputs 22 from the estimator module 18 are provided to the selector module 20. The selector module 20 also receives the discrete terrain indicators 17 directly from various sensors on the vehicle, including the transfer box status signal (whether the gear ratio is set to a HI range or a LO range), the DSC status signal, cruise control status (whether the vehicle's cruise control system is ON or OFF), and trailer connect status (whether or not a trailer is connected to the vehicle). Terrain indicator signals indicative of ambient temperature and atmospheric pressure are also provided to the selector module 20.

The selector module 20 is provided with a probability algorithm 20a for calculating the most suitable control mode for the vehicle subsystems based on the discrete terrain indicator signals 17 received directly from the sensors and the continuous terrain indicators 22, 26 calculated by the estimator module 18 and the road surface roughness module 24, respectively.

The control modes typically include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways. Many other control modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

For each subsystem control mode, the algorithm 20*a* within the selector module 20 performs a probability calculation, based on the terrain indicators, to determine a probability that each of the different control modes is appropriate. The selector module 20 includes a tuneable data map which relates the continuous terrain indicators 22, 26 (e.g. vehicle speed, road roughness, steering angle) to a probability that a particular control mode is appropriate. Each probability value typically takes a value of between 0 and 1. So, for example, the vehicle speed calculation may return a probability of 0.7 for the RB mode if the vehicle speed is relatively slow, whereas if the vehicle speed is relatively high the probability for the RB mode will be much lower (e.g. 0.2). This is because it is much less likely that a high vehicle speed is indicative that the vehicle is travelling over a rock or boulder terrain.

In addition, for each subsystem control mode, each of the discrete terrain indicators 17 (e.g. trailer connection status ON/OFF, cruise control status ON/OFF) is also used to calculate an associated probability for each of the control modes, GGS, RB, Sand, MR or SP OFF. So, for example, if cruise control is switched on by the driver of the vehicle, the probability that the SP OFF mode is appropriate is relatively high, whereas the probability that the MR control mode is appropriate will be lower.

For each of the different sub system control modes, a combined probability value, Pb, is calculated based on the individual probabilities for that control mode, as described above, as derived from each of the continuous or discrete terrain indicators 17, 22, 26. In the following equation, for each control mode the individual probability as determined for each terrain indicator is represented by a, b, c, d . . . n. The combined probability value, Pb, for each control mode is then calculated as follows:

$$Pb = (a \cdot b \cdot c \cdot d \ldots n)/((a \cdot b \cdot c \cdot d \ldots n) + (1-a) \cdot (1-b) \cdot (1-c) \cdot (1-d) \ldots (1-n))$$

Any number of individual probabilities may be input to the probability algorithm 20*a* and any one probability value input to the probability algorithm may itself be the output of a combinational probability function.

Once the combined probability value for each control mode has been calculated, the subsystem control program corresponding to the control mode with the highest probability is selected within the selector module 20 and an output signal 30 providing an indication of this is provided to the subsystem control module 14. The benefit of using a combined probability function based on multiple terrain indicators is that certain indicators may make a control mode (e.g. GGS or MR) more or less likely when combined together, compared with basing the selection on just a single terrain indicator alone.

A further control signal 31 from the selector module 20 is provided to a control module 34.

In phase (2), an integration process is implemented continually within the selector module (20) to determine whether it is necessary to change from the current control mode to one of the alternative control modes.

The first step of the integration process is to determine whether there is a positive difference between the combined probability value for each of the alternative control modes compared with the combined probability value for the current control mode.

By way of example, assume the current control mode is GGS with a combined probability value of 0.5. If a combined probability value for the sand control mode is 0.7, a positive difference is calculated between the two probabilities (i.e. a positive difference value of 0.2). The positive difference value is integrated with respect to time. If the difference remains positive and the integrated value reaches a predetermined change threshold (referred to as the change threshold), or one of a plurality of predetermined change thresholds, the selector module 20 determines that the current terrain control mode (for GGS) is to be updated to a new, alternative control mode (in this example, the sand control mode). A control output signal 30 is then output from the selector module 20 to the subsystem control module 14 to initiate the sand control mode for the vehicle subsystems.

In phase (3), the probability difference is monitored and if, at any point during the integration process, the probability difference changes from a positive value to a negative value, the integration process is cancelled and reset to zero. Similarly, if the integrated value for one of the other alternative control modes (i.e. other than sand), reaches the predetermined change threshold before the probability result for the sand control mode, the integration process for the sand control mode is cancelled and reset to zero and the other alternative control mode, with a higher probability difference, is selected.

If a high speed of response is required, one consequence may be that a high and frequent number of control mode changes are implemented. In some circumstances, the high number of changes may be inappropriate or excessive. The rate of change of the control mode is affected by two elements of the calibration process: the combined probability values of each of the control modes and the integrated positive difference threshold for change (the change threshold). The problem of frequent control mode changes can be countered in one of two ways. If the change threshold is set to a relatively large value, it will take longer for any one control mode to switch to another. This strategy will have an effect on all control mode selections. Alternatively, by ensuring there is only a small difference between the data map probability values for the different control modes, for example by setting all values to be close to 0.5, it will take longer for a change in the control mode to be implemented compared with the situation where there is a large difference. If desired, this strategy can be used to affect the speed of response in relation to only selected ones of the terrain indicators and control modes.

The probability difference between the current control mode and all other control modes is monitored continually and the integrated value for each control mode is continually compared with the predetermined change threshold. The predetermined change threshold is calibrated offline, prior to vehicle running, and is stored in a memory of the selector module 20.

It is beneficial for the predetermined change threshold to be variable with the terrain indicator for surface roughness. In this way the frequency with which the subsystem control mode is changed can be altered, depending on the nature of the terrain roughness in which the vehicle is travelling. For example, if the vehicle is travelling on-road (e.g. on a regular smooth road surface), where the surface roughness is low, the change threshold is set to a relatively high value so that it takes longer for the integrated difference value to reach the threshold and so the control mode is changed less frequently. This avoids a control mode change if, for example, a vehicle mounts a curb for a short period of time on an otherwise straightforward journey on a regular road. Conversely, if the vehicle is travelling off-road, where the surface roughness is high, the change threshold is set to a lower value so that the control mode is changed more frequently to accommodate the genuine changes in terrain that warrant an adjustment to the control mode.

In a preferred embodiment, one or more additional change thresholds may also be implemented for comparison with the integrated difference value, each of which is based on a different one of the terrain indicators. For example, another change threshold may be set dependent on vehicle rolling resistance. In this case the integrated difference value is compared with both thresholds (one for surface roughness and one for rolling resistance), and when a first one of the thresholds is crossed a change to the control mode is initiated.

If it is determined that the combined probability of the current control mode becomes zero, a control output signal 30 from the selector module 20 is sent to the control module 14 to implement one of the other control modes corresponding to that with the highest combined probability. Primarily, this mode of change will be implemented to handle discrete terrain indicators which are indicative that it is no longer acceptable to remain in the current control mode. For example, if the driver selects cruise control, the subsystem control module will automatically set the probability for the MR mode and sand mode to zero. This is because the GGS mode and the SP OFF mode are the only suitable modes for the vehicle subsystems if the vehicle is in a cruise control mode. If the RB mode is selected at the time the driver selects cruise control, the probability for the RB mode is immediately set to zero and the subsystem controller immediately selects one of the other control modes with the highest probability.

Other indicators that may be used to apply constraints to the number of control modes that are "available" for selection include DSC ON/OF status (e.g. if the DSC status is turned OFF, the automatic mode of operation is not available), trailer status and transfer box status (HI/LO range).

There are a number of circumstances in which the integration process will be paused and the current integration value is stored in memory, rather than resetting to zero, as follows: (a) when the vehicle is travelling in reverse; (b) for a predetermined distance travelling forwards after a reverse motion; (c) when the vehicle is in park mode; (d) when the vehicle is travelling below a certain speed; (e) when the vehicle is changing gear; (f) when the vehicle is braking with zero throttle being applied; and (g) when active braking is taking place. For example, for option (b) above, the selector module 20 may be programmed so that, if it is determined that the RB mode has the highest combined probability value, the integration process is started as soon as the vehicle starts to move forwards after a reverse motion, rather than waiting for a predetermined distance.

The subsystem control module 14 will now be described in further detail. The module 14 includes three functions; a validation, fault management and check function 14a, an algorithm 14b to allow switching between automatic operation and manual operation (as described in further detail below), and an interface algorithm 14c for the (HMI) module to support the automatic response mode of operation. The HMI module 32 is shown in more detail in FIG. 2.

The subsystem control module 14 provides three output signals to the HMI module 32. A first output signal 35 provides a notification to the HMI module 32 of whether the automatic mode or the manual mode is active. If the automatic mode is active then a second output signal 36 is provided to notify the driver when the system is "optimising" and a change in the control mode is taking place. A third output signal 37 may also be provided to the HMI module 32 for other purposes.

Referring to FIG. 2, the HMI module 32 provides an interface between the selector module 20 and the driver of the vehicle and includes a selector switch 32a, a messaging module 32b and a High Level Display Function (HLDF) module 32c. The HMI module 32 allows the driver of the vehicle to override the automatic mode and select the manual mode of operation, if preferred, via the selector switch 32a. The HLDF module 32c includes a plurality of graphical indicators (not shown) to indicate to the driver when there has been a change in the selected subsystem control mode when the system is operating in the automatic response mode (i.e. derived from the second output signal 36). Typically, for example, the HLDF module 32c may display a textual indication to the driver along the lines of "CONTROL MODE UPDATING".

On start-up of the vehicle, the control system is in the automatic mode and selector module 20 continually performs the probability analysis described above to deduce which of the various control modes is most appropriate. The selector module 20 automatically adjusts the control mode so that the mode which is most appropriate is used to control the vehicle subsystems. At any time the driver can deliberately override the automatic mode by switching the system into the manual mode via the selector switch 32a of the HMI module 32.

The outputs from the control module 34 to the subsystem control module 14 include a transfer box setting signal 54, an air suspension setting signal 52 and further signal 50. In the sub-system control module 14 a validation check or fault detection process 14a is carried out. The validation and fault detection process 14a operates so as to ensure that if one of the subsystems cannot support a selected control mode, for example because of a fault, appropriate action is taken (e.g. in the form of a warning).

It is a particular benefit of the invention that inputs from the brake and accelerator pedal sensors are provided to the estimator module 18 and are used as terrain indicators in the probability calculations to determine the most appropriate control mode. An indication from the pedal sensors that there is simultaneous use of the brake and the throttle pedal provides an indication of the nature of the terrain over which the vehicle is travelling.

It is a further benefit of the invention that the signals output from the ePAS to indicate the steering force applied to the wheels (steering force applied by the driver combined with steering force applied by the ePAS system) are used to determine the most control mode by inputting the steering force signal to the estimator module 18.

A still further novel aspect of the invention is that the status of the windscreen or headlamp wipers and the duration for which they are operational is used as a terrain indicator for input to the estimator module 18 and/or the selector module 20.

The wiper signal, the steering wheel force applied signal, and the pedal position signals are all input to the VCU 10 so as to contribute to the determination of the most appropriate control mode based on the combined probability calculation within the selector module 20.

Whereas in the aforementioned embodiment the VCU 10 is operable to control the vehicle subsystems 12a-12e in dependence on driving condition indicators which relate to the nature of the terrain over which the vehicle is travelling, in another embodiment the vehicle control system is arranged to control the vehicle subsystems in dependence on driving conditions indicators that are representative of the driving characteristics, or driving style, of the driver. One example of where this technique may be implemented is in a Hybrid Electric Vehicle (HEV). Such vehicles employ an electric machine operable as an electric motor in addition to an internal combustion engine to provide traction. HEVs are typically equipped with a battery for storing electrical power for powering the electric machine. The internal combustion engine is releasably coupled to a crankshaft integrated motor/generator (CIMG) by means of a clutch mechanism. The CIMG is in turn coupled to an automatic transmission. The vehicle is operable to provide drive torque to the transmission by means of the engine alone, the CIMG alone or the engine and the CIMG in parallel. The transmission is connected to a driveline of the vehicle which is typically arranged to drive a pair of front wheels of the vehicle.

The vehicle is configured to operate in either one of a hybrid electric vehicle (HEV) mode, a HEV inhibit mode and a selectable electric vehicle only (EV-only) mode. The VCU 10 is arranged to control the vehicle so as to switch the engine on and off when in the HEV mode, according to an energy management strategy which is modified according to driver behaviour. In order to accomplish this the VCU 10 monitors driver behaviour and determines a value of a driver behaviour evaluation index responsive to the driver's behaviour.

Figure 3:
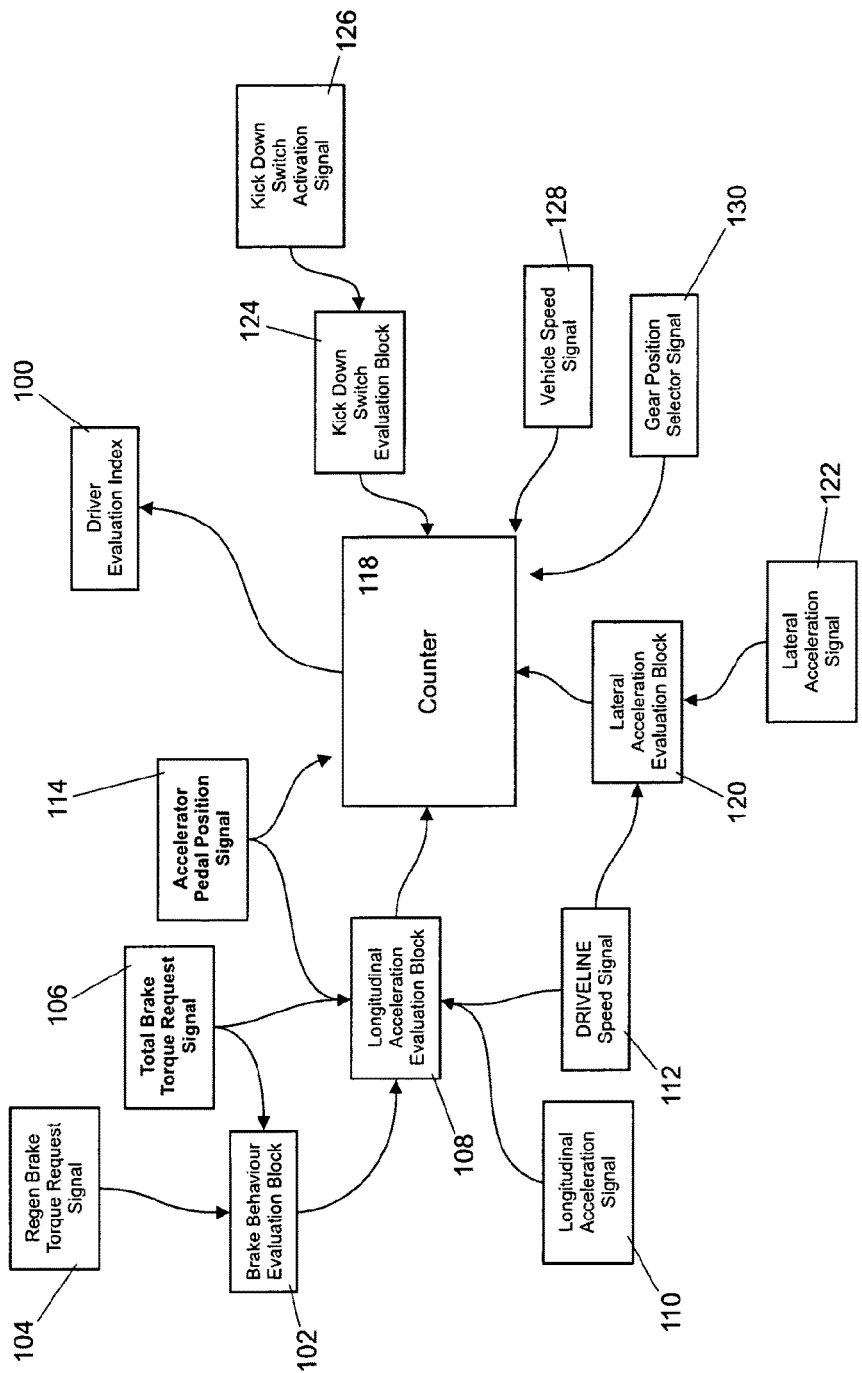
FIG. 3 is a schematic block diagram showing performance parameters associated with a vehicle control system arranged to determine a value of a driver behaviour evaluation index.

FIG. 3 represents a flow diagram of a process in which the VCU 10 determines a value of the driver evaluation index 100 responsive to driver behaviour. Reference herein to a block such as a function block is to be understood to include reference to software code for performing the function or action specified in which an output is provided responsive to one or more inputs. The code may be in the form of a software routine or function called by a main computer program, or may be code forming part of a flow of code not being a separate routine or function. Reference to function block is made for ease of explanation of the manner of operation of the controller.

A brake behaviour evaluation block 102 is arranged to receive a regenerative braking torque request signal 104 and a total brake torque request signal 106 from a brake controller (not shown) that is arranged to control operation of a brake of each of four wheels of the vehicle. The brake controller is typically an anti-lock braking system (ABS) controller.

The total brake torque request signal 106 is a signal responsive to an amount by which the brake pedal of the vehicle is depressed by the driver, representing the total amount of braking torque requested by the driver. In some embodiments the total brake torque request signal 106 is a signal responsive to an amount of a driver-initiated increase in brake pressure due to depression of the brake pedal. Other means for measuring a total amount of braking torque requested by the driver are also useful.

The regenerative braking torque request signal 104 is a signal indicative of the amount of the total braking force provided by the vehicle in the form of regenerative braking. By regenerative braking is meant braking force in the form of negative torque that is applied to the vehicle driveline by the CIMG when it is employed as a generator. Other means for generating useful energy by inducing deceleration of the vehicle are also envisaged.

The brake behaviour evaluation block 102 is arranged to calculate a value of a brake evaluator gain signal (not shown) based on the regenerative and total brake torque request signals 104, 106 and to feed the value of the gain signal to a longitudinal acceleration evaluation block 108. It is to be understood that the brake behaviour evaluation block 102 is configured such that the smaller the proportion of total braking torque provided by regenerative braking, the more aggressive the braking event is determined to be. The value of gain signal is therefore arranged to increase as the proportion of total braking torque provided by regenerative braking decreases.

The longitudinal acceleration evaluation block 108 receives the brake evaluator gain signal from the brake behaviour evaluation block 102 and the total brake torque request signal 106 from the brake controller. In addition it receives a longitudinal acceleration signal 110 being a signal responsive to a value of longitudinal acceleration of the vehicle, a driveline speed signal 112 being a signal responsive to a speed of a portion of the driveline of the vehicle and an accelerator pedal position signal 114 responsive to a position of the accelerator pedal. The block 108 is arranged to output a value of a longitudinal acceleration counter increment to a driver evaluator counter function block 118, the counter increment value 118 being responsive to the brake evaluator gain signal, the total brake torque request signal 106, the longitudinal acceleration signal 110, the driveline speed signal 112 and the accelerator pedal position signal 114.

It is to be understood that reference to a speed of a portion of the driveline of the vehicle may include reference to one or more of a speed of an input shaft of the transmission, a speed of an output shaft of the transmission, a speed of a drive shaft such as an auxiliary driveshaft, a front driveshaft or a rear driveshaft, a speed of one or more wheels, or any other suitable portion of the driveline.

A lateral acceleration evaluation block 120 is also provided and is arranged to calculate a lateral acceleration counter increment value. The lateral acceleration evaluation block 120 is arranged to receive the driveline speed signal 112 and in addition a lateral acceleration signal 122 being a signal responsive to a value of lateral acceleration experienced by the vehicle. The lateral acceleration evaluation block 120 is arranged to calculate the value of the lateral acceleration counter increment value responsive to the driveline speed signal 112 and lateral acceleration signal 122.

A kick-down switch evaluation block 124 is arranged to calculate a value of a kick-down increment or kick-down behaviour index responsive to a kick-down switch activation signal 126. The kick-down switch activation signal 126 is a signal the value of which is responsive to whether a driver has depressed the accelerator pedal by an amount sufficient to activate a kick-down switch. The kick-down switch may be arranged to be activated when the accelerator pedal is fully depressed. In some arrangements the kick-down switch is arranged to be activated when the accelerator pedal is depressed by a smaller amount, for example by 95% or more of its full travel. Other arrangements are also useful.

A vehicle speed signal 128 being a signal having a value responsive to a speed of the vehicle, a gear position selector signal 130 having a value responsive to a gear position selected by the vehicle and the accelerator pedal position signal 114 are also fed to the driver evaluator counter function block 118. The counter function block 118 is arranged to calculate a value of the driver evaluation index value 100 responsive to the values of signals and indexes input thereto.

The value of the driver evaluation index value 100 is output to an energy management portion (not shown) of the VCU 10 in FIG. 1. The VCU 10 is operable to control operation of the vehicle subsystems responsive to the value of the driver evaluation index value 100 via the subsystem controller 14 in the manner described previously, so that the control mode that is most appropriate for the driver evaluation index value 100 is selected for the or each of the vehicle subsystems 12*a*-12*e*.

In this embodiment of the invention therefore, if it is determined that the driver is driving in a performance-oriented driving style, the control means is configured to increase the amount of energy stored in an energy management system of the VCU 10 to maintain the state of charge of the battery.

In addition, or alternatively, other subsystems of the vehicle may be controlled in dependence on the driver evaluation index value, for example the air suspension system (to adjust the ride height), so as to provide a driving experience that is appropriate for the driver's characteristics.

Further in addition or alternatively, other inputs which may be used to determine a driver evaluation index value, either individually or in combination, include a speed of rotation of the engine a speed of rotation of the electric motor, an accelerator pedal position, a state of an accelerator pedal kick-down detector, an amount of positive drive torque, a rate of change of positive drive torque request; a steering wheel angle; and a rate of change of steering wheel angle.

The driver evaluation index value may be used to determine an appropriate driving-style related mode, such as dynamic, sporty or economical style. The skilled man would appreciate that the appropriate mode may be further modified by other driving condition indicators, such as: whether DSC, traction control or ABS is triggered; road roughness; rolling resistance; ambient temperature; known speed limits; or vehicle location (e.g. whether the vehicle is known to be off-road). For example, detection of a 30 mph speed limit or an ambient temperature indicating the possibility of icy conditions may inhibit a dynamic mode. It will be appreciated that a control system which is responsive to the driving style or characteristic of the driver may also be implemented in engine types other than HEV.

It will be understood that the embodiments described above are given by way of example only and are not intended to limit the invention, the scope of which is defined in the appended claims. For example, although in the specific embodiment described it is a probability calculation that is used to determine which of the various subsystem control modes is most appropriate, it will be appreciated that other mathematical techniques may be employed to provide an indication of the likelihood of each of the subsystem control modes being appropriate for the relevant driving condition(s). It will also be understood that the embodiments described may be used individually or in combination.

The invention claimed is:

1. A vehicle control system for at least one vehicle subsystem of a vehicle; the vehicle control system comprising:
   a subsystem controller for initiating control of one or more vehicle subsystems in a selected one of a plurality of subsystem control modes, each of which corresponds to one or more different terrain types for the vehicle, and
   at least one sensor that outputs at least one signal indicative of the terrain in which the vehicle is travelling, wherein the at least one signal is a signal other than a signal generated in response to a user input;
   a processor configured to: receive the at least one signal from the at least one sensor and to evaluate the at least one signal; determine, for each of said subsystem control modes corresponding to one or more different terrain types, the extent to which that subsystem control mode is appropriate for the terrain in which the vehicle is travelling on the basis of the at least one signal and without reliance on a user input; and automatically provide an output indicative of the subsystem control mode that is determined to be the most appropriate, wherein
   in an automatic response mode, the subsystem controller automatically configures each vehicle subsystem in said subsystem control mode determined to be the most appropriate in response to said output indicative of the determined subsystem control mode that is determined to be the most appropriate.

2. The vehicle control system as claimed in claim 1, wherein the processor is configured to determine, for each of said subsystem control modes, the probability that that subsystem control mode is appropriate, and wherein the output provided by the processor is indicative of the subsystem control mode determined to have the highest probability.

3. The vehicle control system as claimed in claim 2, wherein the processor evaluates a plurality of driving condition indicators to determine said probability.

4. The vehicle control system as claimed in claim 3, wherein the processor includes an estimator configured to receive one or more input signals corresponding to a respective one or more of the driving condition indicators and to estimate one or more further driving condition indicators on the basis of the or each of the input signals.

5. The vehicle control system as claimed in claim 3, wherein the processor is further configured to:
   calculate a combined probability value for each subsystem control mode based on individual probability values, for said subsystem control mode, derived from a respective one of the driving condition indicators, and
   wherein the control output signal from the processor is indicative of the control mode with the highest combined probability value.

6. The vehicle control system as claimed in claim 5, wherein the combined probability value (Pb) for each control mode is calculated by:

$$Pb = (a \cdot b \cdot c \cdot d \ldots n)/((a \cdot b \cdot c \cdot d \ldots n) + (1-a) \cdot (1-b) \cdot (1-c) \cdot (1-d) \ldots (1-n))$$

wherein a, b, c, d . . . n represent the individual probability values derived from respective ones of the driving condition indicators.

7. The vehicle control system as claimed in claim 3, wherein one or more of the driving condition indicators is derived from a sensor output signal from a sensor provided on the vehicle.

8. The vehicle control system as claimed in claim 1, further including a switch that enables switching between the automatic response mode in which the automatic control means controls the vehicle subsystems in dependence on the output automatically, and a manual response mode in which the subsystem control mode is selected by the driver manually.

9. The vehicle control system as claimed in claim 1, wherein the at least one vehicle subsystem includes ones or more of: an engine management system, a steering controller, a brakes controller and a suspension controller.

10. A vehicle comprising the vehicle control system as claimed in claim 1.

11. The vehicle control system as claimed in claim 1, wherein the at least one signal comprises an operating signal of the vehicle.

12. A vehicle control system for at least one vehicle subsystem of a vehicle; the vehicle control system comprising:
    a subsystem controller for initiating control of one or more vehicle subsystems in a selected one of a plurality of subsystem control modes, each of which corresponds to one or more different terrain types for the vehicle; and
    a processor configured to: receive and evaluate at least one signal indicative of the terrain in which the vehicle is travelling; determine the extent to which each of the subsystem control modes is appropriate for the terrain in which the vehicle is travelling; and provide an output indicative of the subsystem control mode that is most appropriate, wherein the processor is further configured to:
    evaluate a plurality of drive condition indicators to determine the probability that each of the subsystem control modes is appropriate, and wherein the output provided by the processor is indicative of the subsystem control mode with the highest probability,
    calculate, for each of the control modes, a difference value between the probability for the current control mode and the probability for another control mode,
    integrate each of the difference values with respect to time to calculate an integrated difference value for each of the other control modes,
    compare each of the integrated difference values with a threshold for change, and
    initiate a change in the selected subsystem control mode when the integrated difference value for one of the control modes exceeds the threshold for change.

13. The vehicle control system as claimed in claim 12, wherein the processor compares each of the integrated difference values with a plurality of thresholds for change and initiates a change when a first one of the thresholds for change is reached; and
    wherein each threshold for change is variable in dependence on a different driving condition indicator.

14. The vehicle control system as claimed in claim 13, wherein one or more of the thresholds for change are selected from being:
    dependent on a surface roughness of the terrain in which the vehicle is travelling; and
    dependent on a rolling resistance of the terrain in which the vehicle is travelling.

15. A method of controlling at least one vehicle subsystem of a vehicle; the method comprising:
    initiating control of each of the one or more vehicle subsystems in a selected one of a plurality of different subsystem control modes, each of which corresponds to one or more different terrain types for the vehicle;
    receiving, from at least one sensor, at least one signal indicative of the terrain in which the vehicle is travelling, wherein the at least one signal is a signal other than a signal generated in response to a user input;
    evaluating the at least one signal to determine, for each of said subsystem control modes corresponding to one or more different terrain types, the extent to which that subsystem control mode is appropriate for the terrain in which the vehicle is travelling on the basis of the at least one signal and without reliance on a user input;
    providing an output indicative of the control mode which is determined to be the most appropriate; and
    in an automatic response mode, automatically configuring each said vehicle subsystem in the subsystem control mode determined to be the most appropriate in response to said output indicative of the determined control mode which is determined to be the most appropriate.

16. The method as claimed in claim 15, wherein the evaluating step comprises determining, for each of said subsystem control modes, the probability that that subsystem control mode is appropriate, and providing an output indicative of the control mode determined to have the highest probability.

17. The method as claimed in claim 15, wherein the at least one signal comprises an operating signal of the vehicle.

* * * * *